Figure 1:
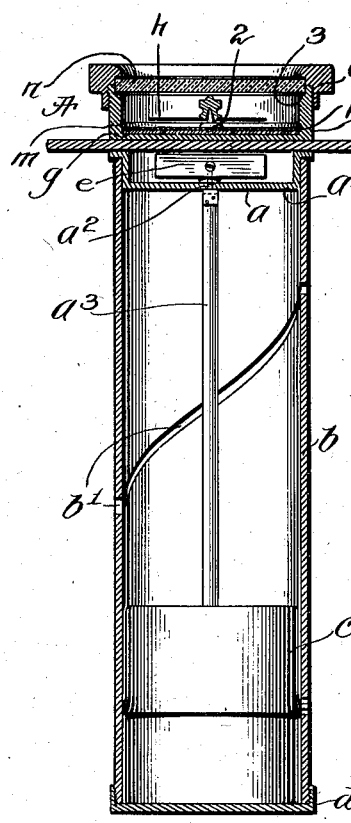

No. 885,675. PATENTED APR. 21, 1908.
M. MARTIN.
FLUID LEVEL INDICATOR.
APPLICATION FILED APR. 5, 1907.

Witnesses.
W. C. Lunsford
Joseph M. Wood

Inventor.
Morris Martin,
by Crosby Gregory attys

UNITED STATES PATENT OFFICE.

MORRIS MARTIN, OF BOSTON, MASSACHUSETTS, ASSIGNOR OF ONE-HALF TO BOSTON AUTO GAGE COMPANY, OF BOSTON, MASSACHUSETTS, A CORPORATION OF MASSACHUSETTS.

FLUID-LEVEL INDICATOR.

No. 885,675.  Specification of Letters Patent.  Patented April 21, 1908.

Application filed April 5, 1907. Serial No. 366,524.

*To all whom it may concern:*

Be it known that I, MORRIS MARTIN, a citizen of the United States, residing in Boston, county of Suffolk, and State of Massachusetts, have invented an Improvement in Fluid-Level Indicators, of which the following description, in connection with the accompanying drawing, is a specification, like letters on the drawing representing like parts.

This invention has for its object the production of a novel magnetically controlled fluid lever indicator, whereby a bushing for holding the gage may be dispensed with, the force of the magnet located within the tank acting through the non-magnetic metal of the tank to turn in unison with it a magnetic needle located outside the tank.

I have shown my invention as embodied in several different workable forms that will be hereinafter more fully described.

Figure 3:
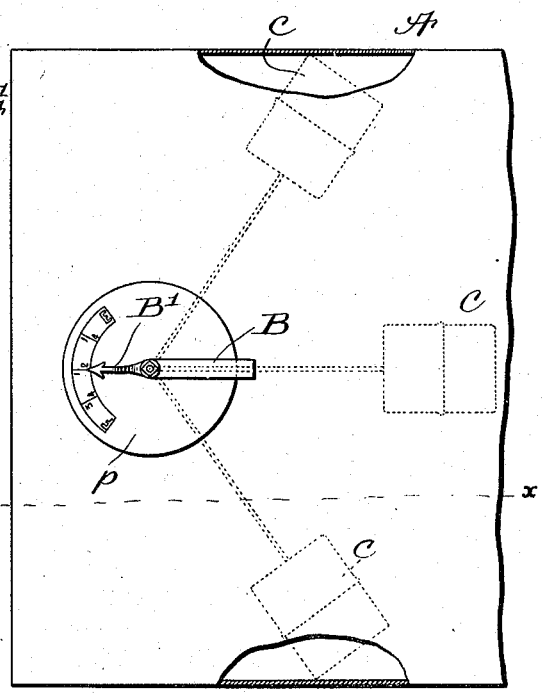
Figure 2:
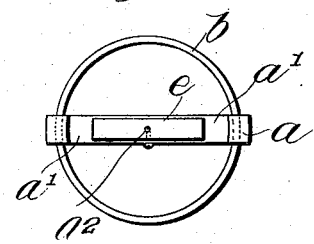
Figure 4:
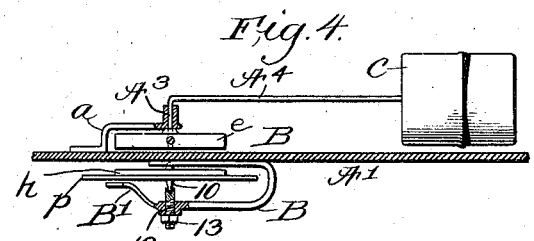
Figure 5:
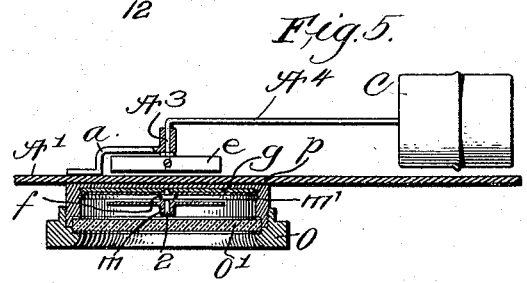

Figure 1 shows the top wall of a tank with a fluid level indicator applied thereto to show its magnetic needle at the top of the tank; Fig. 2 a detail of the device shown in Fig. 1; Fig. 3 shows a modified form of the device applied to one vertical wall of a tank; Fig. 4 a view of the device shown in Fig. 3 below the dotted line $x-x$, Fig. 3; and Fig. 5 is yet another modification of my invention.

Referring to the drawings, A represents the top wall of any usual tank for holding gasolene or other fluid or liquid fuel, and A' a vertical side wall of the tank. Heretofore magnetic gages used in connection with tanks have been applied to bushings set into holes in the body of the tank, usually a hole cut in the top of the tank.

In my studies to produce the cheapest possible magnetic gage for use with a metal tank, I have devised certain parts, to be hereinafter more fully described, that may be applied to the outer and inner side of the tank, without cutting a hole in the tank, and consequently I am enabled to omit the usual bushing.

Referring to Fig. 1, I have soldered to the top of the tank a bearing $a$ the shape of which is shown in Fig. 2, and to the exterior or depending part $a'$ of this bearing I have applied a tube $b$ that receives a float $c$ lighter than gasolene, and to the end of this tube I have applied a cap $d$. The bearing $a$ has a hole that receives the neck $a^2$ of a ribbon $a^3$ suspended from the bearing and provided at its upper end with a magnet $e$, the float embracing the ribbon, and as it rises and falls turning the ribbon and the magnet.

I have shown the tube as provided with a spiral slot $b'$ to receive a pin from the float, the spiral slot turning the float and the ribbon. To the upper side of the tank, I solder a magnetic needle holder $f$ made in Fig. 1 as a circular cup and in the bottom of which I lay a metal plate $g$ from which rises a pin 2 that serves as a pivot for the magnetic needle $h$. The plate $g$ is maintained in its position in the bottom of the magnetic needle holder by means of a wire $m$ snapped into a groove in the inner side of said holder. The holder shown in Fig. 1 has a shoulder 3 on which rests a piece of packing. The packing sustains a glass $n$ and it receives another piece of packing, and a screw ring $o$ is screwed onto the upper end of the holder, the ring clamping the glass $n$ in position on the holder, the under side of the glass being so located with relation to the central hub of the magnetic needle as to retain the same on the pivot 2. As the magnet $e$ is rotated by the rising and falling of the float due to change in depth of gasolene, the north pole of the magnet attracts the south pole of the magnetic needle and the north pole of the magnet the south pole of the needle, thus moving the same in unison with the magnet, the needle traveling over a dial $p$ laid on top of the plate $g$ and having suitable marks to designate the quantity of gasolene, marks for instance such as indicated in United States Patent No. 794,675 issued to me.

Referring to Figs. 3 and 4, where I have represented a modified form of gage, A' shows one upright wall of a tank to the inner side of which, see Fig. 4, I have suitably attached a bearing $a$, it having a hole to receive the crank end $A^3$ of an arm $A^4$ to which I have attached a magnet $e$, the outer end of said arm being provided with a float $c$. To the outer side of the vertical wall of the tank I have connected a magnetic needle holder B, the same being shown as a yoke-shaped piece of metal having a pointer B'. That arm of the holder B, next the wall of the tank, has a pit or cavity to receive a pivot 10 sustained at its outer end in a step 12 screw threaded to engage a threaded part of the hole in the holder, so that said step may be adjusted as necessity requires to provide for true running of the pivot, the step being held in its adjusted position by a check nut 13. The pivot 10 receives a magnetic needle $h$ and outside said needle a dial $p$, the dial being shown in Fig. 3, said figure showing the float in three different positions, the lowermost position being the one occupied by the float when the tank is empty, the uppermost position that when the tank is full, and the middle position when the tank is half full, and it will be noticed that the float holds the magnet in such position that the index "one-half" of the dial, stands opposite the pointer B'.

In the modification Fig. 5, I have shown attached to the inner side of the wall A' of the tank, a bearing $a$ that receives the neck $A^3$ of the float arm $A^4$ carrying the magnet $e$. To the outer side of the tank I have provided a magnetic needle holder $f$ like that shown in Fig. 1 having a screw ring $o$ at its outer end, the glass $o'$ of the gage maintaining the magnetic needle $m$ on the pivot 2, said pivot rising from a metal plate $g$ on which is placed a dial $p$ held in position by a spring-wire ring $m^1$.

The parts hereinbefore described may be placed on the outer and inner sides of the tank in such position that the pivot of the magnetic needle is in line with the neck or device carrying the magnet. I designate the ribbon $a^3$ as the float-carrying rock-shaft and the same term is applicable to the part $A^3$ and $A^4$.

It will be noticed herein that the different parts comprising the gage are attached to the unbroken top or wall of the tank. This gage is especially adapted for use in connection with tanks having gasolene for automobiles and motor boats.

Having described my invention, what I claim as new and desire to secure by Letters Patent is:—

The combination with a metal tank of a bearing connected to the inner side of the tank, a float-carrying shaft mounted in said bearing and provided with a magnet, a magnetic needle holder secured to the outer side of the tank, and a dial to indicate the position of the magnetic needle when moved by the magnet due to variations in the depth of fluid in the tank.

In testimony whereof, I have signed my name to this specification, in the presence of two subscribing witnesses.

MORRIS MARTIN.

Witnesses:
　GEO. W. GREGORY,
　EVANGELINE C. BROWN.